FILTER CIRCUIT

Filed May 4, 1959 2 Sheets-Sheet 1

INVENTOR.
WILLIAM C. DERSCH
BY
Edward Q. Robinson
ATTORNEY

United States Patent Office 3,017,586

Patented Jan. 16, 1962

3,017,586
FILTER CIRCUIT

William C. Dersch, Los Gatos, Calif., assignor to International Business Machines Corporation, New York, N.Y., a corporation of New York Filed May 4, 1959, Ser. No. 810,953
2 Claims. (Cl. 333—17)

This invention relates to electrical impedance networks and more particularly to circuits for passing signals of selective bands of frequencies.

Impedance elements such as capacitors, inductances and resistors may be connected together either in T networks or π networks to form filters for passing or rejecting signals of desired frequencies. Various arrangements of impedance elements may be used for high pass filters, low pass filters, bandpass filters, and band rejection filters. A band rejection filter may be formed from a parallel arrangement of a low pass filter and a high pass filter such that signals in excess of a predetermined frequency are passed by the high pass branch and signals of frequencies less than another predetermined frequency are passed by the low pass branch. If the two branches are tuned such that the two predetermined frequencies are slightly apart from each other, then a gap may exist in the spectrum of frequencies which are passed by neither one branch nor the other, and this gap in the spectrum will constitute a rejection band for the network.

One such band rejection filter includes capacitors and resistors connected in a parallel T arrangement to form a null network, or filter having a rejection band. This type filter is disclosed in the Radio Engineer's Handbook by Frederick Emmons Terman published by the McGraw-Hill Book Company and specifically illustrated on page 918, FIG. 23(*d*).

A circuit for passing signals of a desired band of frequencies may be composed of an amplifier having a negative or degenerative feedback path, and a band rejection filter which is incorporated into the feedback path. Such an amplifier may be biased to substantial cutoff or nonconduction by the negative feedback for most frequencies. However, for frequencies of a particular rejection band of the filter, the feedback path becomes substantially inoperative, and the normal amplification without the deterrent effect of negative feedback will permit those frequencies to pass through the amplifier. This arrangement incorporating a parallel T null network into a degenerative feedback path of an amplifier is disclosed on page 919 of the Radio Engineer's Handbook, supra.

An object of this invention is to provide an improved circuit for passing signals of a selected band of frequencies wherein a selection of the frequency band may be made by applying an appropriate control signal to the circuit.

A further object is to provide a voltage sensitive device for controlling the impedance values of various elements constituting a filter network, and for thereby varying the characteristics of that filter network.

A further object of this invention is to provide a relay stepping circuit responsive to a control voltage and operable to incrementally vary the values of impedance elements for a filter network.

Another object is to provide an electroluminescent-photoconductive apparatus which may be incorporated into a filter network the characteristics of which are sensitive to a control voltage.

A contemplated use for the voltage sensitive band pass filter circuit of this invention lies in apparatus for recreating speech or vocal sounds by selecting appropriate audio frequencies from a noise signal source containing a wide range of frequencies in response to a control voltage developed from a sampling of frequencies in the original spoken words. The complete system for developing a control voltage from sampled speech frequencies and thence for recreating the speech by passing appropriate frequencies in response to the control voltage is the subject of a copending application for U.S. Letters Patent filed by this inventor on April 29, 1959, Serial No. 809,694 and entitled "Speech Bandwidth Compression System."

Other objects of the invention will be pointed out in the following description and claims and illustrated in the accompanying drawings which disclose, by way of example, the principle of the invention and the best mode which has been contemplated of applying that principle.

Figure 5A:
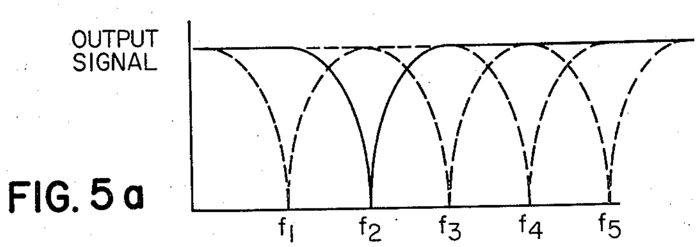
Figure 5B:
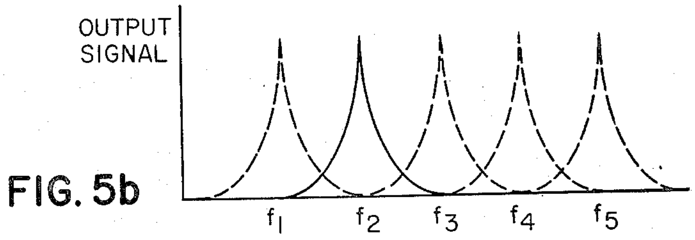

FIGS. 5(*a*) and 5(*b*) illustrate graphically the frequency characteristics of the respective filter employed by this invention and of the amplifier using such a filter in a negative feedback path.

Figure 4:
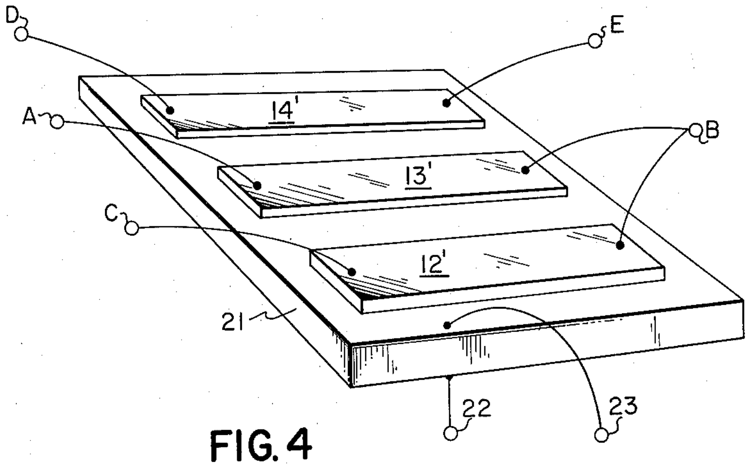
FIG. 4 is an alternative form of this invention using photoconductive elements optically coupled to an electroluminescent element for providing resistances which are variable in response to a control voltage.

Briefly stated, according to this invention, an amplifier is arranged to pass selective bands of frequencies in response to a control voltage which acts to change the parameters of a parallel T band rejection filter connected in a negative feedback path of the amplifier. The band rejection characteristics of the filter 11 are varied by changing the impedance value of three resistors 12, 13 and 14 (see FIG. 1). In FIG. 2 each of the resistors 12, 13 and 14 comprise a plurality of resistors which may be selectively connected in parallel by a sequence of relays 15, 16, 17 and 18 which are responsive to a control voltage appearing at an input terminal 19. In FIG. 4 the filter resistors 12', 13' and 14' are each formed from a photoconductive material positioned to receive light or other radiation from an electroluminescent device 21 which is similarly responsive to a control voltage impressed between the input terminals 22 and 23.

Figure 1:
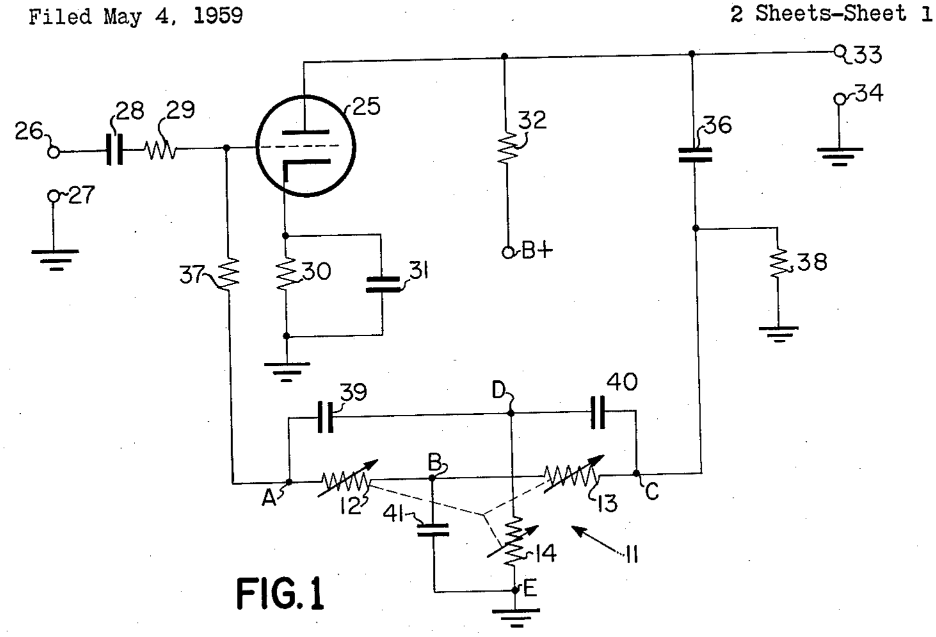
FIG. 1 is a circuit diagram of an amplifier having a negative feedback path including the filter of this invention.
Figure 2:
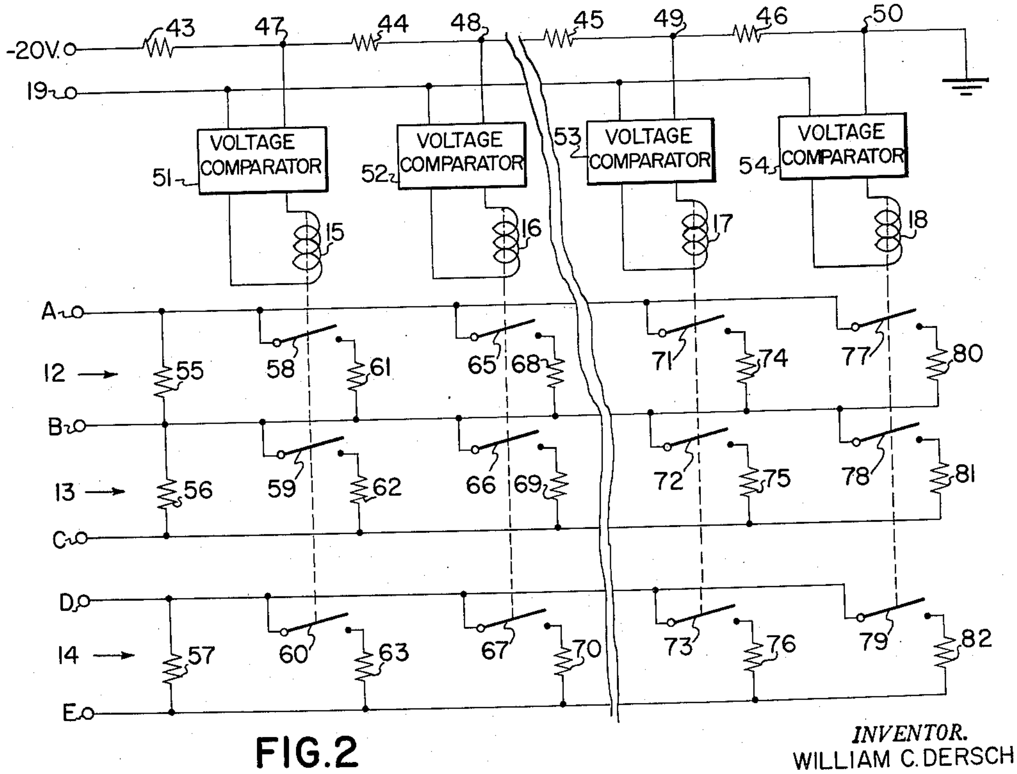
FIG. 2 is a diagram of the circuit for comparing a control voltage against standard voltages and for switching more or less resistance elements into a paralle circuit configuration for varying the net resistance of the circuit branches in response to variations in the control voltage.

The amplifier circuit of FIG. 1 includes a triode 25 coupled to receive noise signals impressed upon input terminals 26 and 27 and passed by coupling elements including a capacitor 28 and a resistor 29. The cathode of the triode 25 may be baised somewhat above ground potential by a cathode resistor 30 which is bypassed for the flow of alternating current by a capictor 31. Output signals are developed across a load resistor 32 which is connected between the anode or plate of the triode 25 and a suitable source of B+ potential. The amplified signal thus developed will appear across output terminals 33 and 34.

A negative feedback path is provided between the anode of the triode 25 and its grid by coupling elements which include a capacitor 36 and a resistor 37 and further includes the parallel T band rejection filter network 11. The grid of the triode 25 may be biased by a grid leak resistor 38 which is actually coupled through the resistor 37 and the impedance network 11. The grid leak resistor 38 supplying a D.C. bias path is therefore effectively connected in series with the filter network 11 rather than in parallel at the filter network 11 output, and therefore, the grid leak will not impair the action of the filter.

The twin-T filter 11 comprises a high pass T section including a pair of serially connected capacitors 39 and 40 and the resistor 14 which connects between ground and a point D between the two capacitors, and further comprises a low pass T section including the two resistors 12 and 13 and a capacitor 41 connecting between the ground point and the serial connection point B between the resistors 12 and 13.

The characteristics of a parallel T network such as 11 are illustrated graphically in FIG. 5(*a*) wherein the output signal which passes through the filter is plotted on the ordinate axis and the frequency is plotted along the abscissa. Assuming that the parameters of the circuit are such that the filter is tuned to a frequency of $f_2$ then the response characteristic of output signal v. frequency curve is shown by the solid line. It may be appreciated from a study of this curve that all frequencies substantially greater than $f_2$ as well as all frequencies substanially less than $f_2$ will be passed by the filter, but the frequencies substantially equal to $f_2$ in value will be attenuated and will not pass through the filter. FIG. 5(*b*) represents the corresponding curves for output characteristics of the amplifier circuit of FIG. 1, and it is to be noted that the frequencies substantially equal to $f_2$ (shown in solid lines) constitute the pass band for the amplifier circuit. Frequencies substantially greater than and substantially less than $f_2$ are prevented from passing through the amplifier due to heavy conduction by the negative feedback path. On the other hand, frequencies of the pass band, approximately equal to $f_2$, pass through the amplifier because the feedback is substantially cut off by the filter 11. Although the rejection and pass bands are shown very peaked and without width at the peak, the practical band width extends on both sides to points of 30% to 50% of the peak value.

By varying the resistors 12, 13 and 14 the band of frequencies which is rejected by the filter 11 may be shifted, and correspondingly those same frequencies become the new pass bands of the amplifier. Thus, FIGS. 5(*a*) and 5(*b*) show families of curves illustrating the various band rejection characteristics of the filter and corresponding band pass characteristics of the amplifier. If the values of the capacitors 39, 40 and 41 and the resistors 12, 13 and 14 are judiciously chosen, the various rejection bands and pass bands may be maintained at very closely the same width measured in cycles and may be evenly spaced along the frequency spectrum as illustrated in FIGS. 5(*a*) and 5(*b*).

In the aforementioned copending application, "Speech Bandwidth Compression System," the spectrum assigned to the speech was approximately from 100 to 6000 cycles. This primary audio spectrum was divided into three major sub-bands of approximately 100 to 1500 cycles, 1500 to 3000 cycles and 3000 to 6000 cycles. In addition, the 100 to 1500 cycle major sub-band was operated on in a special manner to identify the pitch information and is disclosed in my copending application, supra. This resulted in a fourth sub-band in the 100 to 300 cycle range.

A voltage sensitive bandpass filter, as described herein, was assigned to each of these major sub-bands. The filter selected a minor sub-band within the major sub-band, in turn within the primary audio spectrum. Because of the wide range of frequencies to be covered it is obvious to those skilled in the art that optimum circuit constants were not necessarily the same in corresponding position in filters operating in different major sub-bands.

In addition, it was expedient to adjust resistor 37, FIG. 1, in a manner identical to the adjustment of resistors 12, 13 and 14, in FIG. 1, to normalize the gain of the circuit in FIG. 1 with respect to frequency. Thus, the filter circuit in FIG. 1 produces symmetrical minor sub-band pass characteristics within the major sub-band, as shown in FIGS. 5(*a*) and 5(*b*).

By way of example, the following table of typical values is given for the major sub-band of 100 to 1500 cycles. For simplicity, the resistor 37, FIG. 1, is considered a constant, although in actual practice it was incrementally adjusted to make the output minor sub-bands of equal amplitude.

*Table of values*

| | |
|---|---|
| Major sub-band | 100 to 1500 cycles. |
| Number of minor sub-bands | 7. |
| Capacitors **39** and **40** | .006 microfarad. |
| Capacitor **41** | .012 microfarad. |
| Bandwidth | 200 cycles approximately. |
| Minor sub-band | $R_{12}$, $R_{13}$, $R_{14}$. |

| Center frequency | Nominal values, ohms | Nominal values, ohms |
|---|---|---|
| 200 | 110,000 | 25,000 |
| 400 | 64,000 | 15,000 |
| 600 | 44,000 | 10,000 |
| 800 | 35,000 | 7,500 |
| 1,000 | 30,000 | 5,100 |
| 1,200 | 25,000 | 4,500 |
| 1,400 | 20,000 | 3,500 |

One method for controllably varying the resistances 12, 13 and 14 is shown by FIG. 2. A voltage dividing resistance network is made up of a plurality of resistances 43, 44, 45 and 46 all connected in series across a voltage source which may be as indicated −20 volts at one end and a ground reference voltage at the other end. Such a voltage dividing network will produce standard potentials at each of the series connecting points 47, 48, 49 and at the grounded point 50. As previously indicated a control voltage is impressed upon the input terminal 19 which is directly conected to each of the voltage comparator circuits 51, 52, 53 and 54. The voltage comparator circuits, to be described later, function to operate the relays 15, 16, 17 and 18 when the control voltage 19 becomes more positive than their respective standard voltages appearing at the points 47, 48, 49 and 50. Thus, for example, if the control voltage of terminal 19 were more negative than −20 volts then none of the voltage comparator circuits would operate and all of the relays 15, 16, 17 and 18 would remain open as illustrated in FIG. 2. In this condition, the resistive values of the branches 12, 13 and 14, corresponding to the resistors 12, 13 and 14 of FIG. 1 would be equal to the respective resistances of resistors 55, 56 and 57 which are directly connected to the respective branches without any relay switching elements.

If the control voltage impressed on terminal 19 rises to a value equal to that of point 47 (−20 volts+IR drop across resistance 43) then the voltage comparator circuit 51 causes relay 15 to operate closing relay switches 58, 59 and 60 whereupon the resistors 61, 62 and 63 become connected in parallel with the respective resistors 55, 56 and 57 and the resistance of the respective branches 12, 13 and 14 is decreased. Likewise, if the control voltage impressed on terminal 19 continues to increase positively, the next successive voltage comparator circuit 52 will energize the relay coil 16 closing switches 65, 66 and 67 thereby connecting further resistances 68, 69 and 70 into the respective parallel branches and further decreasing the net resistances of 12, 13 and 14. As the control voltage continues to increase positively from its negative value the next successive voltage comparator circuit 53 energizes the next successive relay coil 17 closing further relay switches 71, 72 and 73 to add resistances 74, 75 and 76 in parallel to further decrease the net resistance 12, 13 and 14. And finally, if the control voltage 19 increases positively from its initial negative value to equal ground potential, the final voltage comparator circuit 54 will energize the relay coil 18 whereupon the switches 77, 78 and 79 will close to add further parallel resistances 80, 81 and 82 to the branches 12, 13 and 14.

Obviously, the circuit of FIG. 2 may be extended as indicated by the broken section therein to include further serial resistances, further points of standard potential, further voltage comparator circuits, further relays and further resistances for connection into the parallel branch networks. The net resistance of each branch corresponds to the variable resistors 12, 13 and 14 of FIG. 1, since the terminals A, B, C, D and E of FIG. 2 are intended to be the same electrical connections A, B, C, D and E shown in FIG. 1.

Figure 3:
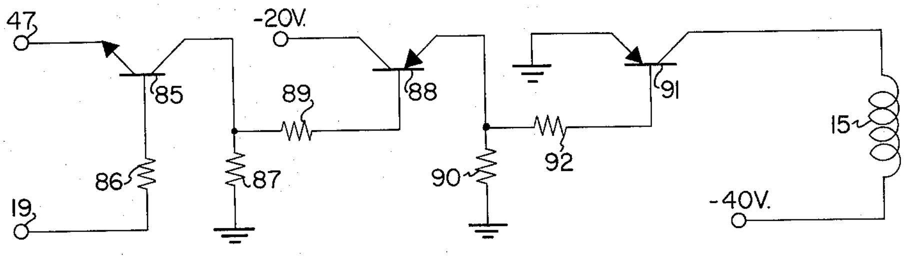
FIG. 3 is a circuit diagram of the voltage comparator circuits which are shown as simple blocks in FIG. 2.

FIG. 3 shows by way of example a complete circuit of the voltage comparator circuit 51 which is identical to the other voltage comparator circuits 52, 53 and 54. As previously indicated, a terminal 47 is connected into the voltage dividing network and receives a standard voltage against which the control voltage impressed on terminal 19 is to be compared. An N-P-N transistor 85 includes an emitter electrode which is connected to the standard voltage of terminal 47 and a base electrode which is coupled to the control voltage through a resistor 86. The collector electrode of transistor 85 is coupled to ground potential through a load resistance 87. Thus connected, the transistor 85 constitutes a voltage amplifier and will be cut off or nonconducting when the base electrode is negative with respect to the emitter electrode. However, when the control voltage of terminal 19 goes positive with respect to the standard voltage of terminal 47, the transistor 85 is biased into conduction. The resistor 86 functions to limit the value of the current which may flow through the base electrode during conduction.

A second transistor 88 is of the P-N-P type and is connected as an emitter follower. When the first transistor 85 is nonconducting, the base electrode of the transistor 88 will remain at ground potential since it is coupled to ground through a resistor 89 and the load resistor 87 of the first transistor. However, when transistor 85 conducts the voltage of its collector electrode drops to substantially the same value as the standard voltage of terminal 47 and the voltage of the base electrode of transistor 88 similarly drops value. When the potential of the base electrode of the transistor 88 drops in value due to the conduction of transistor 85, then transistor 88 likewise conducts and the voltage across its load resistance 90 increases such that the emitter electrode is substantially below ground potential approaching the value of the −20 volts which is applied to the collector electrode.

A third transistor 91 is a power amplifier and has its base electrode coupled to the load resistor 90 of transistor 88 through a coupling resistor 92. The transistor 91 is a P-N-P transistor having the emitter electrode thereof grounded, and therefore, will conduct heavily when the potential of the base electrode drops to a negative value with respect to ground. Thus, the transistor 91 will conduct heavily when the other transistors 85 and 88 go into conduction, and the relay coil 15 which is connected between the collector electrode of transistor 91 and a source of negative voltage will be energized.

In summary, it will be appreciated that the first transistor 85 will remain nonconductive until the potential of the control voltage applied to terminal 19 becomes positive with respect to the standard potential applied to terminal 47, at which time transistor 85 will conduct and cause both transistor 88 and 91 to likewise conduct. Conduction of transistor 91 will cause a current to flow through the relay coil 15, and therefore, the relay switches 58, 59 and 60 (see FIG. 2) will close. Since each of the comparator circuits 51, 52, 53 and 54 will cause their respective relays 15, 16, 17 and 18 to close only when the control voltage of terminal 19 becomes more positive than the respective standard voltages, it will be appreciated that the relays 15, 16, 17 and 18 will close sequentially as the voltage builds up positively from a negative value, and conversely these relays will open in the opposite sequence when the control voltage of terminal 19 begins to go more and more negative. As each successive relay 15 through 18 closes the effective resistance of the parallel circuit branches 12, 13 and 14 which actually constitutes variable resistors 12, 13 and 14 of FIG. 1, will change in steps. With this step variation of the resistors of the filter 11 the band rejection characteristics of the filter will indeed appear as a family of spaced apart curves shown in FIG. 5(*a*) and the bandpass characteristics of the amplifier will be the corresponding curves of 5(*b*). The filter and amplifier characteristics thus change in steps as the various relays open and close. The family of curves of FIGS. 5(*a*) and 5(*b*) may be extended by the addition of further voltage comparator circuits, further relays, and further branch parallel connected resistors.

FIG. 4 illustrates apparatus for varying the resistors 12′, 13′ and 14′ (corresponding to the resistors 12, 13 and 14 of FIG. 11) as a continuous function of the control voltage rather than as a stepped function operating from relay closures. The element 21 is an electroluminescent material formed in a slab and having electrically conducting surfaces applied to the top and bottom thereof. Electrical terminals 22 and 23 are connected to the conductive surfaces to provide a means for impressing the control voltage thereacross. As the control applied to terminals 22 and 23 is varied the intensity of illumination produced by the luminescent material increases and decreases accordingly. The strips 12′, 13′ and 14′ are of a photoconductive material such as lead sulfide and are optically coupled to and electrically insulated from the electroluminescent element 21. This combination will provide a variation in resistivity in accordance with the illumination impinging thereupon. Thus, the resistance across each of the photoconductive elements will be caused to vary in accordance with the variation of the control voltage applied to terminals 22 and 23. If the photoconductive elements 12′, 13′ and 14′ were connected into the circuit of FIG. 1 such that the terminals A, B, C, D and E were connected at the points A, B, C, D and E of FIG. 1 then the band rejection characteristics of the filter 11 and the band pass characteristics of the amplifier could be varied as a continuous function of a control voltage applied across terminals 22 and 23.

Although FIG. 4 illustrates three photoconductive elements 12′, 13′ and 14′ all optically coupled to the same electroluminescent element 21 an obvious alternative would be the use of three electroluminescent elements electrically coupled to the same control voltage, but optically coupled to individual photoconductive elements. Such an alternative may provide a simplicity and economy of manufacture, but may also require that the three separately manufactured devices be properly matched such that equal variations in control voltage will cause substantially equal variations in resistivity of the elements 12′, 13′ and 14′. Such matching of impedance of elements will be unnecessary if due care is exercised and a single electroluminescent element is used as in FIG. 4.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a speech synthesizer, a noise source, means for selecting energy from said noise source comprising: a parallel T network consisting of resistors and capacitors, a control signal, means for establishing a plurality of standard voltage signals, a plurality of voltage comparison means, means connecting indivdual of said comparison means between said control signal and one of said standard signals, each of said comparison means including a relay coupled to vary the resistive values of said resistors whereby the center frequency of the rejection band of said network is controlled by said comparison means and responsive to said control signal while maintaining a constant bandwidth.

2. In a speech synthesizer, a noise source, means for selecting energy from said noise source comprising: a parallel T network consisting of resistors and capacitors, a control signal, means for establishing a plurality of standard voltage signals, a plurality of voltage comparison means, means connecting individual of said comparison means between said control signal and each of said standard voltage signals, each of said comparison means having a relay with a plurality of contacts and operable in response to said comparison means, means connecting said contacts to said network in a manner to change the resistive values of said network in accordance with comparisons between the control signal and the standard voltage signals to alter the center frequency of the selected band while maintaining a constant bandwidth.

References Cited in the file of this patent

UNITED STATES PATENTS

| | | |
|---|---|---|
| 2,372,419 | Ford et al. | Mar. 27, 1945 |
| 2,503,046 | Hills | Apr. 4, 1950 |
| 2,606,966 | Pawley | Aug. 12, 1952 |
| 2,655,627 | McWade | Oct. 13, 1953 |